United States Patent
Grosbach et al.

(10) Patent No.: US 6,728,856 B2
(45) Date of Patent: Apr. 27, 2004

(54) MODIFIED HARVARD ARCHITECTURE PROCESSOR HAVING PROGRAM MEMORY SPACE MAPPED TO DATA MEMORY SPACE

(75) Inventors: James H. Grosbach, Scottsdale, AZ (US); Joshua M. Conner, Apache Junction, AZ (US); Michael Catherwood, Pepperell, MA (US)

(73) Assignee: Microchip Technology Incorporated, Chandler, AZ (US)

( * ) Notice: Subject to any disclaimer, the term of this patent is extended or adjusted under 35 U.S.C. 154(b) by 305 days.

(21) Appl. No.: 09/870,648

(22) Filed: Jun. 1, 2001

(65) Prior Publication Data

US 2002/0184465 A1 Dec. 5, 2002

(51) Int. Cl.⁷ ............................................... G06F 12/02
(52) U.S. Cl. ...................................................... 711/202
(58) Field of Search .............................. 712/35, 37–40; 711/202

(56) References Cited

U.S. PATENT DOCUMENTS

| | | | |
|---|---|---|---|
| 3,781,810 A | 12/1973 | Downing | 712/228 |
| 4,398,244 A | 8/1983 | Chu et al. | 712/244 |
| 4,472,788 A | 9/1984 | Yamazaki | 708/209 |
| 4,481,576 A | 11/1984 | Bicknell | 711/217 |
| 4,488,252 A | 12/1984 | Vassar | 708/505 |
| 4,511,990 A | 4/1985 | Hagiwara et al. | 708/501 |
| 4,556,938 A | 12/1985 | Parker et al. | 712/241 |
| 4,626,988 A | 12/1986 | George | 712/241 |
| 4,730,248 A | 3/1988 | Watanabe et al. | 712/228 |
| 4,782,457 A | 11/1988 | Cline | 708/205 |
| 4,807,172 A | 2/1989 | Nukiyama | 708/209 |
| 4,829,420 A | 5/1989 | Stahle | 711/200 |
| 4,829,460 A | 5/1989 | Ito | 708/209 |
| 4,839,846 A | 6/1989 | Hirose et al. | 708/497 |
| 4,872,128 A | 10/1989 | Shimizu | 708/209 |
| 4,882,701 A | 11/1989 | Ishii | 712/241 |
| 4,941,120 A | 7/1990 | Brown et al. | 708/497 |
| 4,943,940 A | 7/1990 | New | 708/507 |
| 4,959,776 A | 9/1990 | Deerfield et al. | 711/217 |
| 4,977,533 A | 12/1990 | Miyabayashi et al. | 708/404 |
| 4,984,213 A | 1/1991 | Abdoo et al. | 365/230.03 |
| 5,007,020 A | 4/1991 | Inskeep | 711/200 |
| 5,012,441 A | 4/1991 | Retter | 711/217 |
| 5,032,986 A | 7/1991 | Pathak et al. | 711/217 |
| 5,038,310 A | 8/1991 | Akagiri et al. | 708/205 |
| 5,056,004 A | 10/1991 | Ohde et al. | 712/241 |
| 5,099,445 A | 3/1992 | Studor et al. | 708/209 |
| 5,101,484 A | 3/1992 | Kohn | 712/241 |
| 5,117,498 A | 5/1992 | Miller et al. | 712/241 |
| 5,122,981 A | 6/1992 | Taniguchi | 708/497 |

*Primary Examiner*—David L. Robertson
(74) *Attorney, Agent, or Firm*—Swidler Berlin Shereff Friedman, LLP

(57) ABSTRACT

A processor has an architecture that provides the processing speed advantages of the Harvard architecture, but does not require special purpose instructions or two separate external memories in order to expand both data memory and program instruction memory. The processor has separate program memory space and data memory space, but provides the capability to map at least a portion of the program memory space to the data memory space. This allows most program instructions that are processed to obtain the speed advantages of simultaneous program instruction and data access, yet provides a means to access program memory resident data without special purpose instructions. It also allows program memory space and data memory space to be expanded externally to the processor using only one external memory device that includes both program instructions and data. The processor includes a program memory space operable to store program instructions and data, a data memory space operable to store data, and mapping circuitry operable to map at least a portion of the program memory space to the data memory space. The program memory space may be internal to the processor. The processor may further comprise a page register operable to specify a location of the program memory space that is mapped to the data memory space.

13 Claims, 4 Drawing Sheets

U.S. PATENT DOCUMENTS

| | | | | |
|---|---|---|---|---|
| 5,155,823 A | | 10/1992 | Tsue | 711/217 |
| 5,197,023 A | | 3/1993 | Nakayama | 708/505 |
| 5,197,140 A | | 3/1993 | Balmer | 711/220 |
| 5,206,940 A | | 4/1993 | Murakami et al. | 711/218 |
| 5,212,662 A | | 5/1993 | Cocanougher et al. | 708/508 |
| 5,239,654 A | * | 8/1993 | Ing-Simmons et al. | 712/20 |
| 5,276,634 A | | 1/1994 | Suzuki et al. | 708/497 |
| 5,282,153 A | | 1/1994 | Bartkowiak et al. | 708/233 |
| 5,327,543 A | | 7/1994 | Miura et al. | 712/224 |
| 5,327,566 A | | 7/1994 | Forsyth | 710/260 |
| 5,379,240 A | | 1/1995 | Byrne | 708/209 |
| 5,418,976 A | * | 5/1995 | Iida | 712/38 |
| 5,448,703 A | | 9/1995 | Amini et al. | 710/110 |
| 5,448,706 A | | 9/1995 | Fleming et al. | 711/217 |
| 5,463,749 A | | 10/1995 | Wertheizer et al. | 711/110 |
| 5,469,377 A | | 11/1995 | Amano | 708/497 |
| 5,471,600 A | | 11/1995 | Nakamoto | 711/5 |
| 5,497,340 A | | 3/1996 | Uramoto et al. | 708/552 |
| 5,499,380 A | | 3/1996 | Iwata et al. | 711/212 |
| 5,504,916 A | * | 4/1996 | Murakami et al. | 712/38 X |
| 5,548,544 A | | 8/1996 | Matheny et al. | 708/497 |
| 5,568,412 A | | 10/1996 | Han et al. | 708/497 |
| 5,596,760 A | | 1/1997 | Ueda | 712/241 |
| 5,600,813 A | | 2/1997 | Nakagawa et al. | 711/217 |
| 5,619,711 A | | 4/1997 | Anderson | 712/221 |
| 5,642,516 A | | 6/1997 | Hedayat et al. | 710/260 |
| 5,689,693 A | | 11/1997 | White | 712/224 |
| 5,694,350 A | | 12/1997 | Wolrich et al. | 708/497 |
| 5,696,711 A | | 12/1997 | Makineni | 708/497 |
| 5,706,460 A | | 1/1998 | Craig et al. | 712/204 |
| 5,715,470 A | | 2/1998 | Asano et al. | 375/341 |
| 5,737,570 A | | 4/1998 | Koch | 711/149 |
| 5,740,419 A | | 4/1998 | Potter | 712/241 |
| 5,748,516 A | | 5/1998 | Goddard et al. | 708/497 |
| 5,764,555 A | | 6/1998 | McPherson et al. | 708/497 |
| 5,774,711 A | | 6/1998 | Henry et al. | 712/244 |
| 5,778,416 A | | 7/1998 | Harrison et al. | 711/5 |
| 5,790,443 A | | 8/1998 | Shen et al. | 708/491 |
| 5,808,926 A | | 9/1998 | Gorshtein et al. | 708/505 |
| 5,812,439 A | | 9/1998 | Hansen | 708/497 |
| 5,825,730 A | | 10/1998 | Nishida et al. | 369/44.32 |
| 5,826,096 A | | 10/1998 | Baxter | 712/24 |
| 5,828,875 A | | 10/1998 | Halvarsson et al. | 712/241 |
| 5,862,065 A | | 1/1999 | Muthusamy | 708/521 |
| 5,867,726 A | * | 2/1999 | Ohsuga et al. | 712/32 |
| 5,880,984 A | | 3/1999 | Burchfiel et al. | 708/501 |
| 5,892,697 A | | 4/1999 | Brakefield | 708/496 |
| 5,892,699 A | | 4/1999 | Duncan et al. | 708/628 |
| 5,894,428 A | | 4/1999 | Harada | 708/306 |
| 5,909,385 A | | 6/1999 | Nishiyama et al. | 708/630 |
| 5,917,741 A | | 6/1999 | Ng | 708/497 |
| 5,930,159 A | | 7/1999 | Wong | 708/550 |
| 5,930,503 A | | 7/1999 | Drees | 713/1 |
| 5,938,759 A | | 8/1999 | Kamijo | 712/299 |
| 5,941,940 A | | 8/1999 | Prasad et al. | 708/523 |
| 5,943,249 A | | 8/1999 | Handlogten | 708/496 |
| 5,951,627 A | | 9/1999 | Kiamilev et al. | 708/404 |
| 5,951,679 A | | 9/1999 | Anderson et al. | 712/241 |
| 5,991,787 A | | 11/1999 | Abel et al. | 708/400 |
| 5,996,067 A | | 11/1999 | White | 712/224 |
| 6,009,454 A | | 12/1999 | Dummermuth | 709/108 |
| 6,014,723 A | | 1/2000 | Tremblay et al. | 711/1 |
| 6,026,489 A | | 2/2000 | Wachi et al. | 712/241 |
| 6,044,392 A | | 3/2000 | Anderson et al. | 708/551 |
| 6,044,434 A | | 3/2000 | Oliver | 711/110 |
| 6,058,409 A | | 5/2000 | Kozaki et al. | 708/409 |
| 6,058,410 A | | 5/2000 | Sharangpani | 708/551 |
| 6,058,464 A | | 5/2000 | Taylor | 711/217 |
| 6,061,780 A | | 5/2000 | Shippy et al. | 712/204 |
| 6,076,154 A | | 6/2000 | Van Eijndhoven et al. | 712/24 |
| 6,101,521 A | | 8/2000 | Kosiec | 708/550 |
| 6,115,732 A | | 9/2000 | Oberman et al. | 708/625 |
| 6,128,728 A | | 10/2000 | Dowling | 712/228 |
| 6,134,574 A | | 10/2000 | Oberman et al. | 708/551 |
| 6,145,049 A | | 11/2000 | Wong | 710/267 |

* cited by examiner

MODIFIED HARVARD ARCHITECTURE PROCESSOR HAVING PROGRAM MEMORY SPACE MAPPED TO DATA MEMORY SPACE

FIELD OF THE INVENTION

The present invention relates to a modified Harvard architecture processor having data memory space mapped to program memory space.

BACKGROUND OF THE INVENTION

Processors, including microprocessors, digital signal processors and microcontrollers, operate by running software programs that are embodied in one or more series of program instructions stored in a memory. The processors run the software by fetching the program instructions from the series of program instructions, decoding the program instructions and executing them. In addition to program instructions, data is also stored in memory that is accessible by the processor. Generally, the program instructions process data by accessing data in memory, modifying the data and storing the modified data into memory.

One well-known architecture for processors is known as the Harvard architecture. In this architecture, data and program instructions are stored in separate memories that can be accessed simultaneously. Because of this simultaneous access, the Harvard architecture provides significant processing speed advantages over other architectures. A typical Harvard architecture processor that includes internal memory includes two separate memories, one for data, and one for program instructions. In order to expand the memory capacity of such a processor, memory external to the processor must be added. However, since a Harvard architecture processor has two separate memories, in order to expand both data memory and program instruction memory, two separate external memories must be added. This is a significant disadvantage when low-cost systems are being built. Some conventional processors provide the capability to access data that is stored in program instruction memory using special instructions, but this is a limited solution.

A need arises for a processor having an architecture that provides the processing speed advantages of the Harvard architecture, but does not require special purpose instructions or two separate external memories in order to expand both data memory and program instruction memory.

SUMMARY OF THE INVENTION

The present invention is a processor that has separate program memory space and data memory space, but provides the capability to map at least a portion of the program memory space to the data memory space. This allows data that is stored in the program memory space to be accessed as though it were actually stored in data memory space, using standard data memory access instructions, including arithmetic and logical operation instructions. The processor has an architecture that provides the processing speed advantages of the Harvard architecture, but does not require two separate external memories, or two external memory busses, in order to expand both data memory and program instruction memory. This allows most program instructions that are processed to obtain the speed advantages of simultaneous program instruction and data access. It also allows program memory space and data memory space to be expanded externally to the processor using only one external memory device that includes both program instructions and data and without using special purpose instructions.

According to the present invention, a processor includes a program memory space operable to store program instructions and data, a data memory space operable to store data, and mapping circuitry operable to map at least a portion of the program memory space to the data memory space. The program memory space may be internal to the processor. The processor may further comprise a page register operable to specify a location of the program memory space that is mapped to the data memory space.

In one aspect of the present invention, the processor may be operably connected to an external memory device operable to store program instructions and data. The processor may further comprise circuitry operable to map at least a portion of the external memory device to the data memory space. The external memory device may further comprise program memory space. The portion of the external memory device that is mapped to the data memory space may be separate from the program memory space in the external memory device or the portion of the external memory device that is mapped to the data memory space may overlap with the program memory space in the external memory device.

In one aspect of the present invention, at least a portion of the program memory space may be internal to the processor. The processor may further comprise a page register operable to specify a location of the program memory space that is mapped to the data memory space. The processor may be operably connected to an external memory device operable to store program instructions and data. At least a portion of the external memory device may be mapped to the program memory space that is mapped to the data memory space.

DETAILED DESCRIPTION

Figure 1:
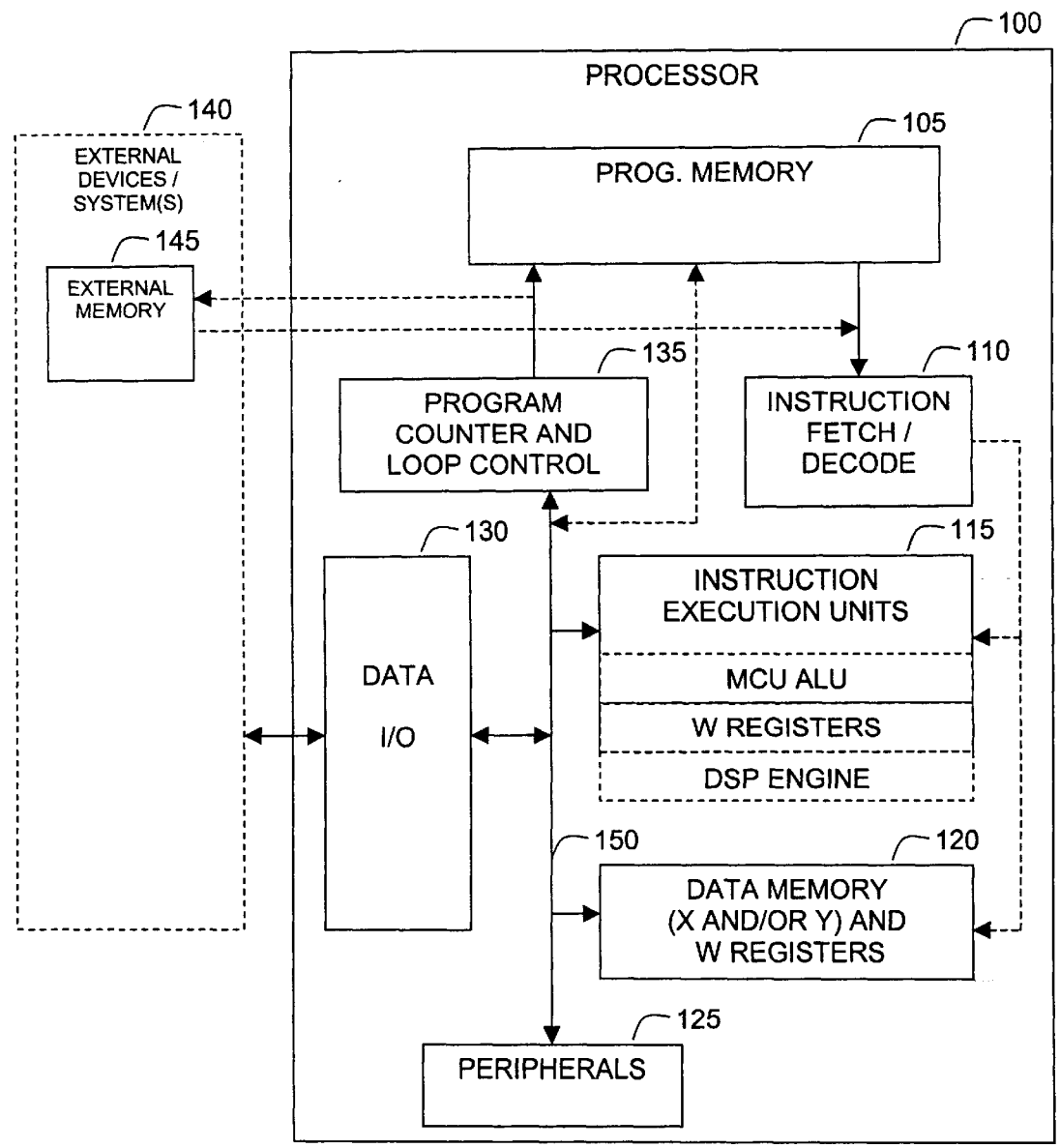
FIG. 1 depicts a functional block diagram of an embodiment of a processor chip within which the present invention may find application.

Overview of Processor Elements FIG. 1 depicts a functional block diagram of an embodiment of a processor chip within which the present invention may find application. Referring to FIG. 1, a processor 100 is coupled to external devices/systems 140. The processor 100 may be any type of processor including, for example, a digital signal processor (DSP), a microprocessor, a microcontroller, or combinations thereof. The external devices 140 may be any type of systems or devices including input/output devices such as keyboards, displays, speakers, microphones, memory, or other systems which may or may not include processors. Moreover, the processor 100 and the external devices 140 may together comprise a stand alone system.

The processor 100 includes a program memory 105, an instruction fetch/decode unit 110, instruction execution units 115, data memory and registers 120, peripherals 125, data I/O 130, and a program counter and loop control unit 135. The bus 150, which may include one or more common buses, communicates data between the units as shown.

The program memory 105 stores software embodied in program instructions for execution by the processor 100. The program memory 105 may comprise any type of non-volatile memory such as a read only memory (ROM), a programmable read only memory (PROM), an electrically programmable or an electrically programmable and erasable read only memory (EPROM or EEPROM) or flash memory. In addition, the program memory 105 may be supplemented with external nonvolatile memory 145 as shown to increase the complexity of software available to the processor 100. Alternatively, the program memory may be volatile memory, which receives program instructions from, for example, an external non-volatile memory 145. When the program memory 105 is nonvolatile memory, the program memory may be programmed at the time of manufacturing the processor 100 or prior to or during implementation of the processor 100 within a system. In the latter scenario, the processor 100 may be programmed through a process called in-line serial programming.

The instruction fetch/decode unit 110 is coupled to the program memory 105, the instruction execution units 115, and the data memory 120. Coupled to the program memory 105 and the bus 150 is the program counter and loop control unit 135. The instruction fetch/decode unit 110 fetches the instructions from the program memory 105 specified by the address value contained in the program counter 135. The instruction fetch/decode unit 110 then decodes the fetched instructions and sends the decoded instructions to the appropriate execution unit 115. The instruction fetch/decode unit 110 may also send operand information including addresses of data to the data memory 120 and to functional elements that access the registers.

The program counter and loop control unit 135 includes a program counter register (not shown) which stores an address of the next instruction to be fetched. During normal instruction processing, the program counter register may be incremented to cause sequential instructions to be fetched. Alternatively, the program counter value may be altered by loading a new value into it via the bus 150. The new value may be derived based on decoding and executing a flow control instruction such as, for example, a branch instruction. In addition, the loop control portion of the program counter and loop control unit 135 may be used to provide repeat instruction processing and repeat loop control as further described below.

The instruction execution units 115 receive the decoded instructions from the instruction fetch/decode unit 110 and thereafter execute the decoded instructions. As part of this process, the execution units may retrieve one or two operands via the bus 150 and store the result into a register or memory location within the data memory 120. The execution units may include an arithmetic logic unit (ALU) such as those typically found in a microcontroller. The execution units may also include a digital signal processing engine, a floating point processor, an integer processor, or any other convenient execution unit. A preferred embodiment of the execution units and their interaction with the bus 150, which may include one or more buses, is presented in more detail below with reference to FIG. 2.

The data memory and registers 120 are volatile memory and are used to store data used and generated by the execution units. The data memory 120 and program memory 105 are preferably separate memories for storing data and program instructions respectively. This format is a known generally as a Harvard architecture. It is noted, however, that according to the present invention, the architecture may be a Von-Neuman architecture or a modified Harvard architecture, which permits the use of some program space for data space. A dotted line is shown, for example, connecting the program memory 105 to the bus 150. This path may include logic for aligning data reads from program space such as, for example, during table reads from program space to data memory 120.

Referring again to FIG. 1, a plurality of peripherals 125 on the processor may be coupled to the bus 125. The peripherals may include, for example, analog to digital converters, timers, bus interfaces and protocols such as, for example, the controller area network (CAN) protocol or the Universal Serial Bus (USB) protocol and other peripherals. The peripherals exchange data over the bus 150 with the other units.

The data I/O unit 130 may include transceivers and other logic for interfacing with the external devices/systems 140. The data I/O unit 130 may further include functionality to permit in circuit serial programming of the Program memory through the data I/O unit 130.

Figure 2:
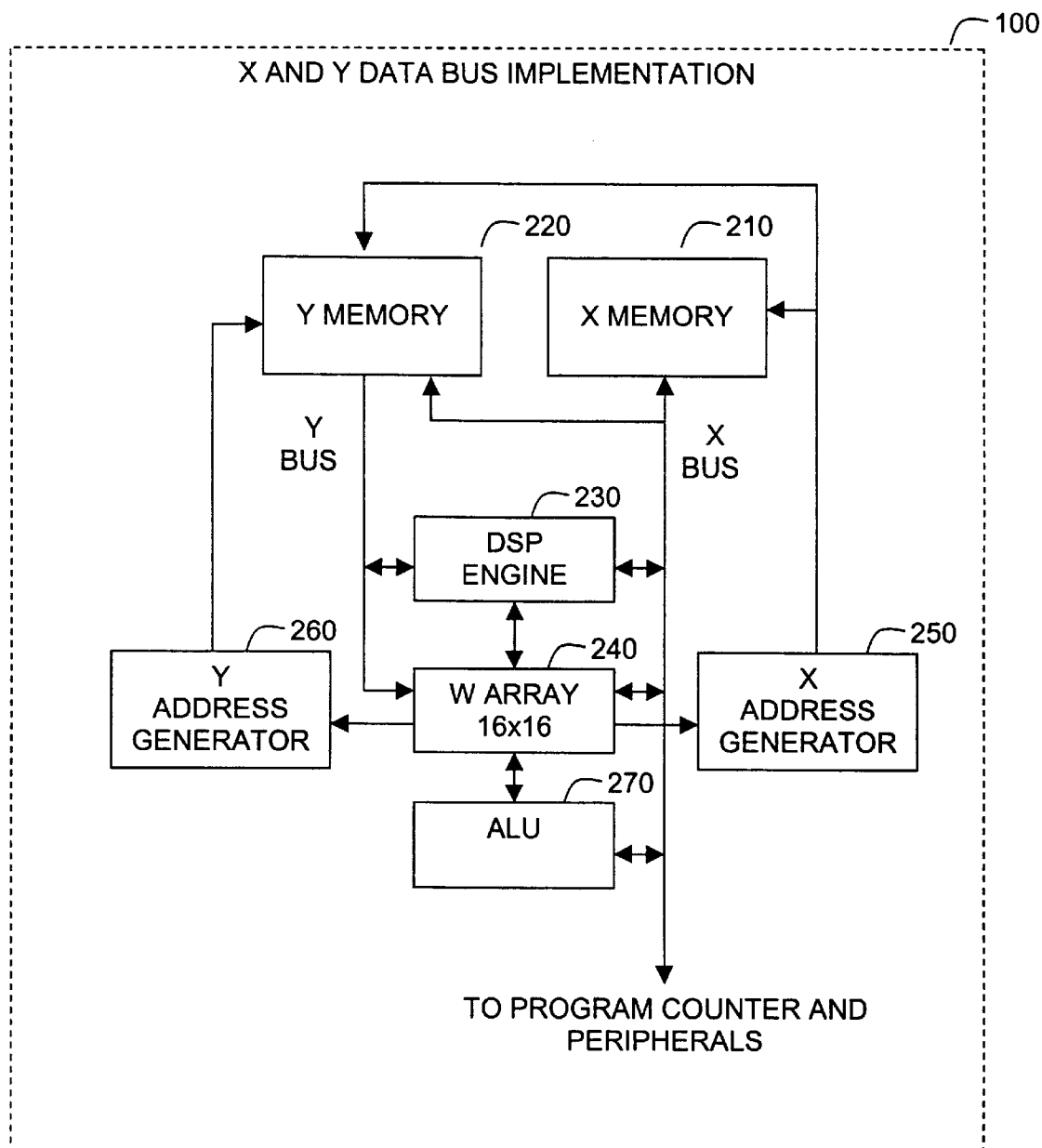
FIG. 2 depicts a functional block diagram of a data busing scheme for use in a processor 100, such as that shown in FIG. 1.

FIG. 2 depicts a functional block diagram of a data busing scheme for use in a processor 100, such as that shown in FIG. 1, which has an integrated microcontroller arithmetic logic unit (ALU) 270 and a digital signal processing (DSP) engine 230. This configuration may be used to integrate DSP functionality to an existing microcontroller core. Referring to FIG. 2, the data memory 120 of FIG. 1 is implemented as two separate memories: an X-memory 210 and a Y-memory 220, each being respectively addressable by an X-address generator 250 and a Y-address generator 260. The X-address generator may also permit addressing the Y-memory space thus making the data space appear like a single contiguous memory space when addressed from the X address generator. The bus 150 may be implemented as two buses, one for each of the X and Y memory, to permit simultaneous fetching of data from the X and Y memories.

The W registers 240 are general purpose address and/or data registers. The DSP engine 230 is coupled to both the X and Y memory buses and to the W registers 240. The DSP engine 230 may simultaneously fetch data from each the X and Y memory, execute instructions which operate on the simultaneously fetched data and write the result to an accumulator (not shown) and write a prior result to X or Y memory or to the W registers 240 within a single processor cycle.

In one embodiment, the ALU 270 may be coupled only to the X memory bus and may only fetch data from the X bus. However, the X and Y memories 210 and 220 may be addressed as a single memory space by the X address generator in order to make the data memory segregation transparent to the ALU 270. The memory locations within the X and Y memories may be addressed by values stored in the W registers 240.

Any processor clocking scheme may be implemented for fetching and executing instructions. A specific example follows, however, to illustrate an embodiment of the present invention. Each instruction cycle is comprised of four Q clock cycles Q1–Q4. The four phase Q cycles provide timing signals to coordinate the decode, read, process data and write data portions of each instruction cycle.

According to one embodiment of the processor 100, the processor 100 concurrently performs two operations—it fetches the next instruction and executes the present instruction. Accordingly, the two processes occur simultaneously. The following sequence of events may comprise, for example, the fetch instruction cycle:

Q1: Fetch Instruction
Q2: Fetch Instruction
Q3: Fetch Instruction
Q4: Latch Instruction into prefetch register, Increment PC The following sequence of events may comprise, for example, the execute instruction cycle for a single operand instruction:

Q1: latch instruction into IR, decode, and determine addresses of operand data

Q2: fetch operand

Q3: execute function specified by instruction and calculate destination address for data Q4: write result to destination The following sequence of events may comprise, for example, the execute instruction cycle for a dual operand instruction using a data pre-fetch mechanism. These instructions pre-fetch the dual operands simultaneously from the X and Y data memories and store them into registers specified in the instruction. They simultaneously allow instruction execution on the operands fetched during the previous cycle.

Q1: latch instruction into IR, decode, and determine addresses of operand data

Figure 3:
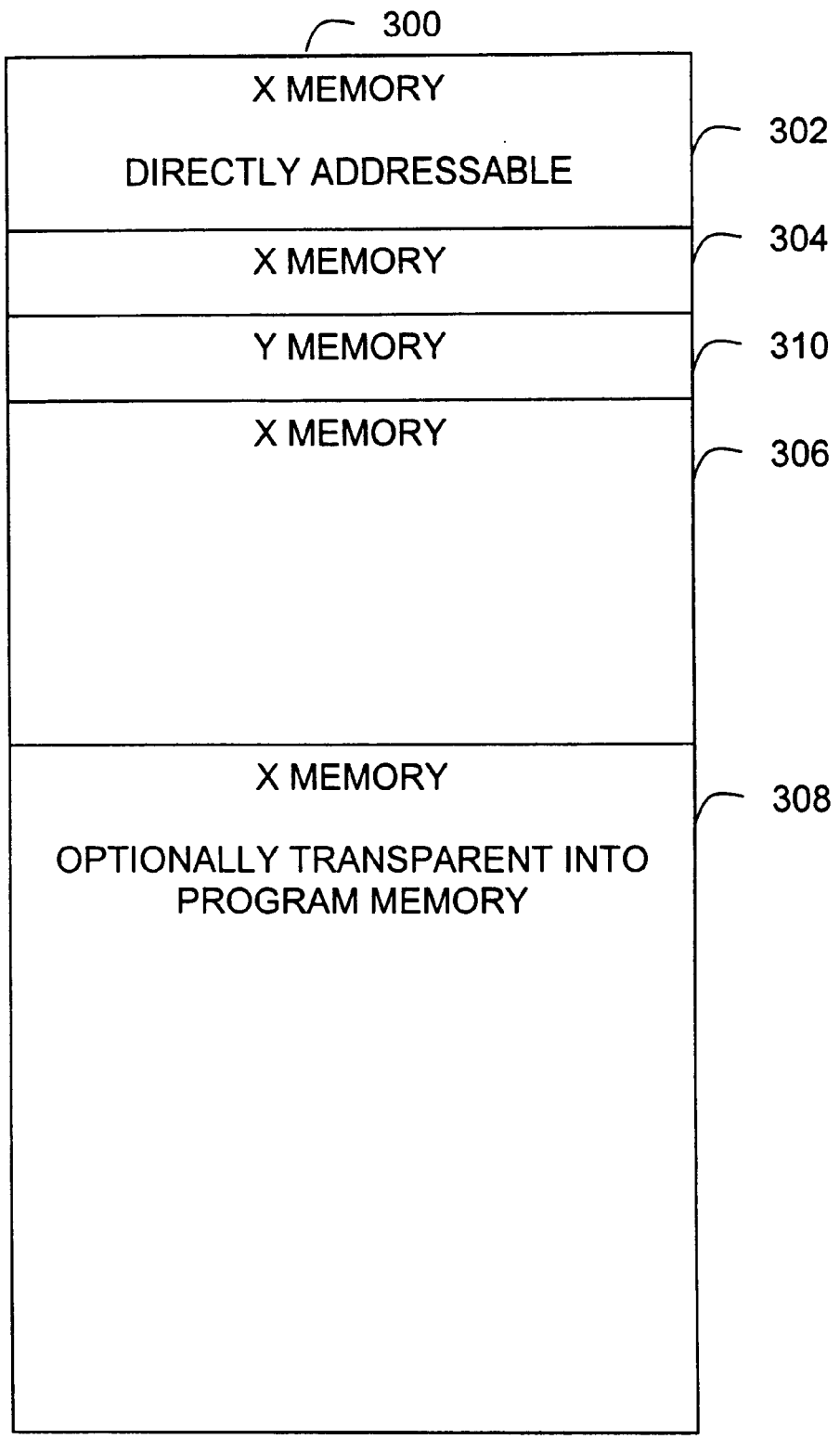
FIG. 3 depicts an exemplary memory map of a data space memory, which may be implemented in the processor shown in FIG. 2.

Q2: pre-fetch operands into specified registers, execute operation in instruction Q3: execute operation in instruction, calculate destination address for data Q4: complete execution, write result to destination An exemplary memory map of data space memory 300 is shown in FIG. 3. Data space memory 300 includes a plurality of blocks of memory, divided into X address memory and Y address memory. Typically, data space memory 300 is implemented as random access read-write memory (RAM), so as to allow data to be read and written as necessary. However, read-only memory (ROM) may also be advantageously used for at least a portion of data space memory 300. For example, constant data values, look up tables, etc., may be usefully stored in ROM. In the example shown in FIG. 3, X address memory includes memory blocks 302, 304, 306, and 308, while Y address memory includes memory block 310. Data space memory 300 is split into two blocks, X address memory and Y address memory. A key element of this architecture is that the Y address memory space is a subset of the X address memory space, and is fully contained within the X address memory space. In order to provide an apparent linear addressing space, the X and Y address memory spaces would typically have contiguous addresses, although this is not an architectural necessity.

In the example shown in FIG. 3, memory block 302 includes a block of contiguous memory, starting at data memory location 0x0000. Memory block 302 is reserved in X address memory space and is directly addressable using memory direct instructions. The remaining X address memory and Y address memory spaces are indirectly addressable using other instructions. In the example shown in FIG. 3, Y address memory space 310 is located between two blocks of X address memory space, block 304 and 306. However, this is only an example, as the Y address memory space 310 may be located anywhere within the non-reserved X address memory space. The partition between the X and Y address spaces is arbitrary and is determined by the memory decode shown in FIG. 2. Both the X and Y address generator can generate any effective address (EA) within the range of data memory space 300. However, accesses to memory addresses that are in the other address space, or to memory addresses that are not implemented with physical memory, will return fixed data, rather than data from memory.

Figure 4:
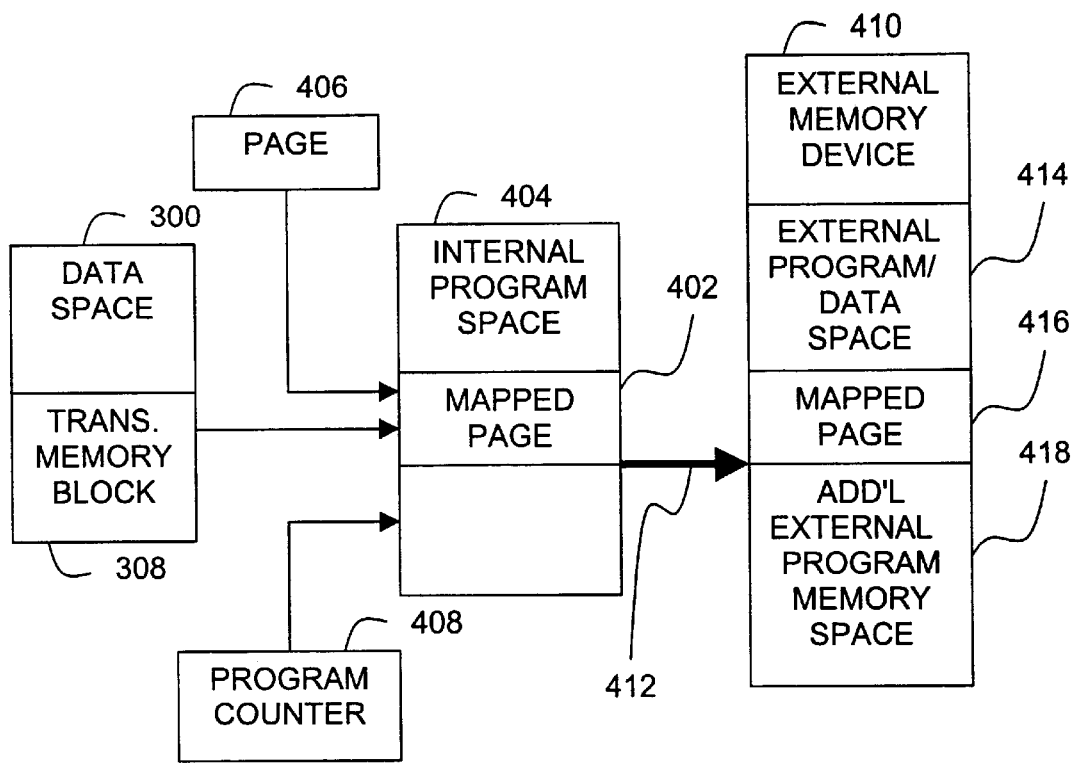
FIG. 4 depicts an exemplary block diagram of program memory space to data memory space mapping which may be implemented in the processor shown in FIG. 2, according to the present invention.

Memory block 308 is shown in FIG. 3 as being an X address memory block. Memory block 308, which includes at least a portion of data memory space 300, may be used as X address memory, Y address memory, or a mixture of X address memory and Y address memory. When used as X address memory, memory block 308 may be mapped into program memory space. This provides transparent access to constant data, such as stored constants, look up tables, etc., from the X address data memory space without the need to use special instructions. This feature also allows the mapping of a portion of data memory space into an unused area of program memory, and since all unused internal addresses are mapped externally, to the external memory bus. This is shown in FIG. 4, which is an exemplary block diagram of the program memory space to data memory space mapping. Data memory space block 308, which is a portion of data memory space 300 is mapped to a data memory space page 402 in internal program memory space 404. The location of data memory space page 402 in internal program memory space 404 is specified by page register 406. Internal program memory space 404 is still used for program instruction access, as specified by program counter (PC) 408.

External memory device 410 is connected to the external memory bus 412 of the processor. External memory device 410 includes external program/data memory space 414. Since all unused internal addresses are mapped externally to the external memory bus, data memory space mapped page 402 is also mapped to external data memory space mapped page 416, which is located in external program/data memory space 412. If external memory device 410 is a RAM, then data may be read from and written to external data memory space mapped page 416. External program/data space 414 may also include additional external program memory space 418, which may be separate from external data memory space mapped page 416, or which may overlap with external data memory space mapped page 416.

While specific embodiments of the present invention have been illustrated and described, it will be understood by those having ordinary skill in the art that changes may be made to those embodiments without departing from the spirit and scope of the invention.

What is claimed is:

1. A processor comprising:
   a program memory space operable to store program instructions and data;
   a data memory space operable to store data;
   mapping circuitry operable to map at least a portion of the program memory space to the data memory space, so that data accessible to the processor by addressing the data memory space is stored in the program memory space.

2. The processor of claim 1, wherein the data accessible to the processor by addressing the data memory space that is stored in the program memory space is accessible using any data memory access instruction.

3. The processor of claim 2, wherein the program memory space is stored in a memory included in the processor.

4. The processor of claim 3, further comprising a page register operable to specify a location of the program memory space that is mapped to the data memory space.

5. The processor of claim 2, wherein the processor is operably connected to a memory device that is not included in the processor, which is operable to store program instructions and data.

6. The processor of claim 5, further comprising circuitry operable to map at least a portion of the memory device that is operably connected to the processor to the data memory space, wherein data accessible to the processor by addressing the data memory space is stored in the memory device that is operably connected to the processor.

7. The processor of claim 6, wherein the memory device that is operably connected to the processor further comprises memory accessible to the processor by addressing program memory space.

8. The processor of claim 7, wherein the portion of the memory device that is operably connected to the processor that is mapped to the data memory space is separate from the program memory space in the external memory device.

9. The processor of claim 7, wherein the portion of the memory device that is operably connected to the processor that is mapped to the data memory space overlaps with the program memory space in the memory device that is operably connected to the processor.

10. The processor of claim 2, wherein at least a portion of the program memory space is stored in a memory included in the processor.

11. The processor of claim 2, further comprising a page register operable to specify a location of the program memory space that is mapped to the data memory space.

12. The processor of claim 11, wherein the processor is operably connected to a memory device that is not included in the processor, which is operable to store program instructions and data.

13. The processor of claim 12, wherein at least a portion of the program memory space that is mapped to the data memory space is stored in the memory device that is operably connected to the processor.

* * * * *